(12) United States Patent
Gaither

(10) Patent No.: US 6,223,256 B1
(45) Date of Patent: Apr. 24, 2001

(54) COMPUTER CACHE MEMORY WITH CLASSES AND DYNAMIC SELECTION OF REPLACEMENT ALGORITHMS

(75) Inventor: Blaine D. Gaither, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/898,637

(22) Filed: Jul. 22, 1997

(51) Int. Cl.$^7$ .................................................. G06F 12/00
(52) U.S. Cl. .................... 711/134; 711/118; 711/133; 711/159; 711/160
(58) Field of Search ........................... 711/123–160, 119, 711/118

(56) References Cited

U.S. PATENT DOCUMENTS

| | | | | |
|---|---|---|---|---|
| 4,802,086 | * | 1/1989 | Gay et al. . | |
| 5,025,366 | * | 6/1991 | Baror | 711/128 |
| 5,457,793 | * | 10/1995 | Elko et al. | 707/205 |
| 5,465,342 | * | 11/1995 | Walsh | 711/119 |
| 5,481,691 | * | 1/1996 | Day, III et al. | 711/133 |
| 5,530,958 | * | 6/1996 | Agarwal et al. | 711/3 |
| 5,553,262 | * | 9/1996 | Ishida et al. | 711/123 |
| 5,568,632 | * | 10/1996 | Nelson | 711/133 |
| 5,603,004 | | 2/1997 | Kurpanek et al. | 395/445 |
| 5,636,362 | * | 6/1997 | Stone et al. | 711/129 |
| 5,717,893 | * | 2/1998 | Mattson | 711/129 |
| 5,737,749 | * | 4/1998 | Patel et al. | 711/123 |
| 5,737,750 | * | 4/1998 | Kumar et al. | 711/129 |
| 5,778,429 | * | 7/1998 | Sukegawa et al. | 711/129 |
| 5,778,432 | * | 7/1998 | Rubin et al. | 711/135 |
| 5,845,317 | * | 12/1998 | Pawlowski | 711/128 |
| 5,875,465 | * | 2/1999 | Kilpatrick et al. | 711/134 |
| 5,974,508 | * | 10/1999 | Maheshwari | 711/133 |

OTHER PUBLICATIONS

"Page Placement Algorithms For Large Real–Indexed Caches", by R.E. Kessler and Mark D. Hill, University of Wisconsin. ACM Transactions on Computer Systems, vol. 10, No. 4, Nov. 1992, pp. 338–359.

"Selective Victim Caching: A Method to Improve the Performance of Direct–Mapped Caches" by Dimitrios Stiliadis and Anujan Varma, University of California Santa Cruz. Proceedings of the Twenty–Seventh Annual Hawaii International Conference on System Sciences, 1994.

"Reducing Conflicts In Direct–Mapped Caches With A Temporality–Based Design" by Jude A. Rivers and Edward S. Davidson, University of Michigan. 1996 International Conference on Parallel Processing.

"PA7200: A PA–RISC Processor With Integrated High Performance MP Bus Interface" by Gordon Kurpanek, Ken Chan, Jason Zheng, Eric DeLano, William Bryg, Hewlett–Packard Company.

\* cited by examiner

Primary Examiner—Do Hyun Yoo
Assistant Examiner—Nasser Moazzami
(74) Attorney, Agent, or Firm—Augustus W. Winfield

(57) ABSTRACT

A cache memory system for a computer. Target entries for the cache memory include a class attribute. The cache may use a different replacement algorithm for each possible class attribute value. The cache may be partitioned into sections based on class attributes. Class attributes may indicate a relative likelihood of future use. Alternatively, class attributes may be used for locking. In one embodiment, each cache section is dedicated to one corresponding class. In alternative embodiments, cache classes are ranked in a hierarchy, and target entries having higher ranked attributes may be entered into cache sections corresponding to lower ranked attributes. With each of the embodiments, entries with a low likelihood of future use or low temporal locality are less likely to flush entries from the cache that have a higher likelihood of future use.

12 Claims, 4 Drawing Sheets

COMPUTER CACHE MEMORY WITH CLASSES AND DYNAMIC SELECTION OF REPLACEMENT ALGORITHMS

FIELD OF INVENTION

This invention relates generally to digital computer memory systems and more specifically to systems for improving hit rate in cache memory systems.

BACKGROUND OF THE INVENTION

Most computer systems employ a multilevel hierarchy of memory systems, with relatively fast, expensive, limited-capacity memory at the highest level of the hierarchy and proceeding to relatively slower, lower cost, higher-capacity memory at the lowest level of the hierarchy. Typically, the hierarchy includes a small fast memory called a cache, either physically integrated within a processor integrated circuit or mounted physically close to the processor for speed. There may be separate instruction caches and data caches. There may be multiple levels of caches. An item that is fetched from a lower level in the memory hierarchy typically evicts (replaces) an item from the cache. The selection of which item to evict may be determined by a replacement algorithm. The present patent document is concerned with replacement strategies and algorithms, as explained further below.

The goal of a memory hierarchy is to reduce the average memory access time. A memory hierarchy is cost effective only if a high percentage of items requested from memory are present in the highest levels of the hierarchy (the levels with the shortest latency) when requested. If a processor requests an item from a cache and the item is present in the cache, the event is called a cache hit. If a processor requests an item from a cache and the item is not present in the cache, the event is called a cache miss. In the event of a cache miss, the requested item is retrieved from a lower level (longer latency) of the memory hierarchy. This may have a significant impact on performance. The average memory access time may be reduced by improving the cache hit/miss ratio, reducing the time penalty for a miss, and reducing the time required for a hit. The present patent document is primarily concerned with improving the hit/miss ratio of a cache.

Ideally, an item is placed in the cache only if it is likely to be referenced again soon. Items having this property are said to have locality. Items having little or no reuse "pollute" a cache and ideally should never be placed in a cache. There are two types of locality, temporal and spatial. Temporal locality means the very same item is likely to be referenced again soon. Spatial locality means that items having addresses near the address of a recently referenced item are likely to be referenced soon. For example, sequential data streams and sequential instruction streams typically have high spatial locality and little temporal locality. Since data streams often have a mixture of temporal and spatial locality, performance may be reduced because sections of the data stream that are inherently random or sequential can flush items out of the cache that are better candidates for long term reference. Typically, the minimum amount of memory that can be transferred between a cache and a next lower level of the memory hierarchy is called a line, or sometimes a block or page. Typically, spatial locality is accommodated by increasing the size of the unit of transfer (line, block, page). In addition, if a data stream is sequential in nature, prefetching can also be used. There are practical limits to the size of cache lines, and prefetching can flush lines that may soon be reused from the cache. The present patent document is primarily concerned with strategies for ensuring that lines having the highest probability of reuse remain in a cache, and for ensuring that lines having a lower probability of reuse do not evict lines having a higher probability of reuse.

If a cache stores an entire line address along with the data and any line can be placed anywhere in the cache, the cache is said to be fully associative. However, for a large cache in which any line can be placed anywhere, the hardware required to rapidly determine if an entry is in the cache (and where) may be very large and expensive. For large caches, a faster, space saving alternative is to use a subset of an address (called an index) to designate a line position within the cache, and then store the remaining set of more significant bits of each physical address (called a tag) along with the data. In a cache with indexing, an item with a particular address can be placed only at the one place (set of lines) within the cache designated by the index. If the cache is arranged so that the index for a given address maps to exactly one line in the subset, the cache is said to be direct mapped. In general, large direct mapped caches can have a shorter access time for a cache hit relative to associative caches of the same size. However, direct mapped caches have a higher probability of cache misses relative to associative caches of the same size because many lines of memory map to each available space in the direct mapped cache. If the index maps to more than one line in the subset, the cache is said to be set associative. All or part of an address is hashed to provide a set index which partitions the address space into sets. For a direct mapped cache, since each line can only be placed in one place, no algorithm is required for replacement. In general, all caches other than direct mapped caches require an algorithm for replacement. That is, when an index maps to more than one line of memory in a cache set, we must choose which line to replace. The present patent document is concerned with any caches in which a replacement algorithm is required for determining which item in a cache to evict when a new item is added to the cache. Therefore, the present patent document is primarily concerned with set associative or fully associative caches.

Typically, a memory is organized into words (for example, 32 bits per word) and a line is typically multiple words (for example, 16 words per line). Physical main memory is also typically divided into pages (also called blocks or segments), with many lines per page. In many modern computer memory architectures, a CPU produces virtual addresses that are translated by a combination of hardware and software to physical addresses, which access physical main memory. A group of virtual addresses may be dynamically assigned to each page. Virtual memory (paging or segmentation) requires a data structure, sometimes called a page table, that translates the virtual address to the physical address. Typically, a page table entry (PTE) includes more than just an address. A PTE may include information regarding write protection, use authorization, and many other status bits and attribute bits useful to the operating system. To reduce address translation time, computers commonly use a specialized associative cache dedicated to address translation, commonly called a Translation Look-aside Buffer (TLB). A TLB entry is a cache entry, where the tag is the high order bits of the page's virtual address and the data portion is a physical page address plus the additional status bits and attribute bits stored in a PTE.

In the event of a cache miss, typically one line in a cache is replaced by the newly requested line. In the case of a direct mapped cache, a new line replaces a line at one fixed place. In the case of fully associative caches, a replacement algorithm is needed to decide which line in the cache is to be replaced. In the case of set associative caches, a replacement algorithm is needed to decide which line in a set is replaced. The algorithm for deciding which lines should be replaced in a fully associative or set associative cache is typically based on run-time historical data, such as which line is least-recently-used. Alternatively, a replacement algorithm may be based on historical data regarding least-frequently-used. Still other alternatives include first-in first-out, and pseudo-random replacement. Finally, as discussed immediately below, it may be useful to have a replacement algorithm which stores certain lines once and then locks them in place (never replaces them).

In some computer systems, some applications may have higher priority than others so that improving the cache hit rate or guaranteeing cache hits may be more important for some applications than other applications. Likewise, certain data may be more important or more critical than other data. In particular, guaranteed consistent response time for some applications may be critical, even if other applications run slower as a result. Some time critical control applications, for example, cannot use general caching. If an event occurs and it is absolutely necessary for software to respond within a minimum or known constant (deterministic) time, general caching cannot be used because there is always a finite probability that critical code or data is not present in the cache. In some systems, a separate memory structure or buffer is provided that has the speed of a cache, but is dedicated to a specific set of lines or pages. Eviction is not permitted. In other systems, sections of a cache or specific lines in a cache may be locked to hold critical portions of code in the cache. For example, Intel Pentium Pro processors have a Page-Global-Enable (PGE) flag in page-table-entries that provides a mechanism to prevent frequently used pages from being flushed from a TLB. Cyrix MediaGX processors provide locked sections of a cache for critical graphics data and emulation routines, with an extended instruction set for transferring data in and out of locked sections.

Fully associative caches and set associative caches with a least-recently-used replacement algorithm work well for lines having temporal locality. However, data or instruction streams having high spatial locality and low temporal locality can completely flush an associative cache with a least-recently-used replacement algorithm.

One approach to improving the cache hit ratio for data streams having mixed locality is described in G. Kurpanek et al, "PA7200: A PA-RISC Processor with Integrated High Performance MP Bus Interface," *COMPCON Digest of Papers,* February 1994, pp. 375–382. In Kurpanek et al, lines requested from memory are first loaded into an auxiliary fully associative cache, called an assist cache, in a first-in first-out order. A "spatial-locality" hint can be specified in load and store instructions to indicate that data exhibits spatial locality but not temporal locality. When a data line in the assist cache is evicted, if the line contains the spatial locality hint, the line is flushed back to main memory and is not moved to a main cache. Lines are promoted to a main cache only if the spatial locality hint is not present.

An alternative approach to improving the cache hit ratio for data streams having mixed locality is described in J. A. Rivers, et al, "Reducing Conflicts in Direct-Mapped Caches With A Temporality-Based Design," *Proceedings of the 1996 International Conference on Parallel Processing,* Vol. 1, pp 154–163. Rivers et al also provide a separate auxiliary cache, called a Non-Temporal (NT) buffer. Blocks requested from memory are first placed into a main cache. Each block in the main cache is then monitored during its lifetime in the main cache to see if any part of each block is referenced again. If no word within a block is reused, the block is tagged as being Non-temporal (NT). If a request for data results in a miss in the main cache and a hit in a secondary cache, and if the NT bit is set for the block being referenced, the block is placed in the NT buffer instead of the main cache. Therefore, blocks are monitored at run time, and blocks exhibiting non-temporal locality are prevented from being placed in the main cache a second time.

Both Kurpanek et al and Rivers et al reduce the probability of a line having low temporal locality of evicting a line from a main cache that has a higher probability of reuse. However, each requires an additional hardware cache structure. There is need for further improvements in cache performance for data streams having mixed locality. There is a need for further improvements in providing partial cache locking. In particular, there is a need for a cache having different replacement algorithms for different classes of items being cached.

SUMMARY OF THE INVENTION

Multiple example embodiments of cache systems are disclosed that provide a great deal of flexibility in optimizing cache performance for a wide variety of applications. In each example embodiment, items to be cached have a corresponding class attribute. Each class attribute may have a different corresponding replacement algorithm. A cache may be logically partitioned into sections. Cache logical sections may be dedicated to corresponding classes or the sections and classes may be ranked in a hierarchy with some sections corresponding to multiple classes. For example, for a cache where each section is dedicated to a single class, one section may provide locking for time critical code or data, another section may provide cache space for code or data having temporal locality with replacement based on which line is least recently used, and still another section may provide cache space for code or data having spatial locality with a replacement algorithm that replaces lines based on a first-in first-out algorithm. Alternatively, several classes may map to the same section, and in particular classes may overlap completely, so that different replacement algorithms control different statistical replacement distributions within a cache. For example, each class may have access to the entire cache, but for one class the replacement algorithm implements a statistical distribution of replacement such that replacement near the beginning of the cache (line 0) is most likely, and for another class a different replacement algorithm implements a statistical distribution of replacement such that replacement near the end (line N) is most likely. Appropriate use of different replacement algorithms for different classes can reduce the probability of items having a relatively low probability of future use causing the replacement of code or data that are time critical or causing the replacement of code or data with a higher probability of future use.

Items to be cached (lines, pages or objects) have a corresponding cache class attribute. The cache class attribute may be determined in advance at compile-time or at load-time. Alternatively, the cache class attribute may be determined at run-time based on historical data. There are at least two separate classes.

Cache classes may be assigned to items independently of whether the items are code or data. Alternatively, code and data may be explicitly assigned different cache classes to provide separate replacement algorithms for code and data within a single cache.

In a first example embodiment, there is a one-to-one relationship between classes and cache logical sections, cache logical sections are dedicated to corresponding classes, and items to be cached are placed only in the cache section consistent with the corresponding cache class attribute.

In a second example embodiment, classes are ranked in a hierarchy, each class has a corresponding section, but the corresponding section is not dedicated to a single class. In the second example embodiment, target cache items may be placed in the cache section corresponding to the cache class attribute or they may be placed in any cache section corresponding to a class lower in the class hierarchy. With a hierarchy of classes, there are at least two alternative section placement algorithms. In a first hierarchical section placement algorithm, an item can replace any item having an equal or lower class in the hierarchy. That is, in the first hierarchical section placement algorithm, class hierarchy dominates for eviction. In a second hierarchical section placement algorithm, an item having a particular class (e.g., Class C) can replace an item having a higher class in the hierarchy (e.g. Class B) within the section corresponding to the particular class (Class C), or within a section corresponding to a lower class in the hierarchy (e.g. Class D) than the particular class (Class C). That is, in the second hierarchical section placement algorithm, location (logical section) may dominate over class hierarchy for eviction.

In a third example embodiment, cache class attributes indicate expected temporal locality of items to be cached. A fully associative TLB is logically divided into sections, with each section dedicated to a corresponding class. Class attributes may be determined in advance. In particular, data expected to have a low temporal locality can be identified at compile-time or load-time. The cache is partitioned so that most of the cache is available for items having a high likelihood of future reuse (high temporal locality). At least one section is reserved for a class of lines specifically identified as having a low temporal locality, although they may have high spatial locality. The result is that large data structures that inherently have a relatively low temporal locality cannot cause the replacement of code or data with a much higher probability of temporal locality.

In a fourth example embodiment, each cache class has access to the entire cache, but each class has a different spatial distribution within the cache.

DETAILED DESCRIPTION OF THE PREFERRED EMBODIMENT OF THE INVENTION

Figure 1:
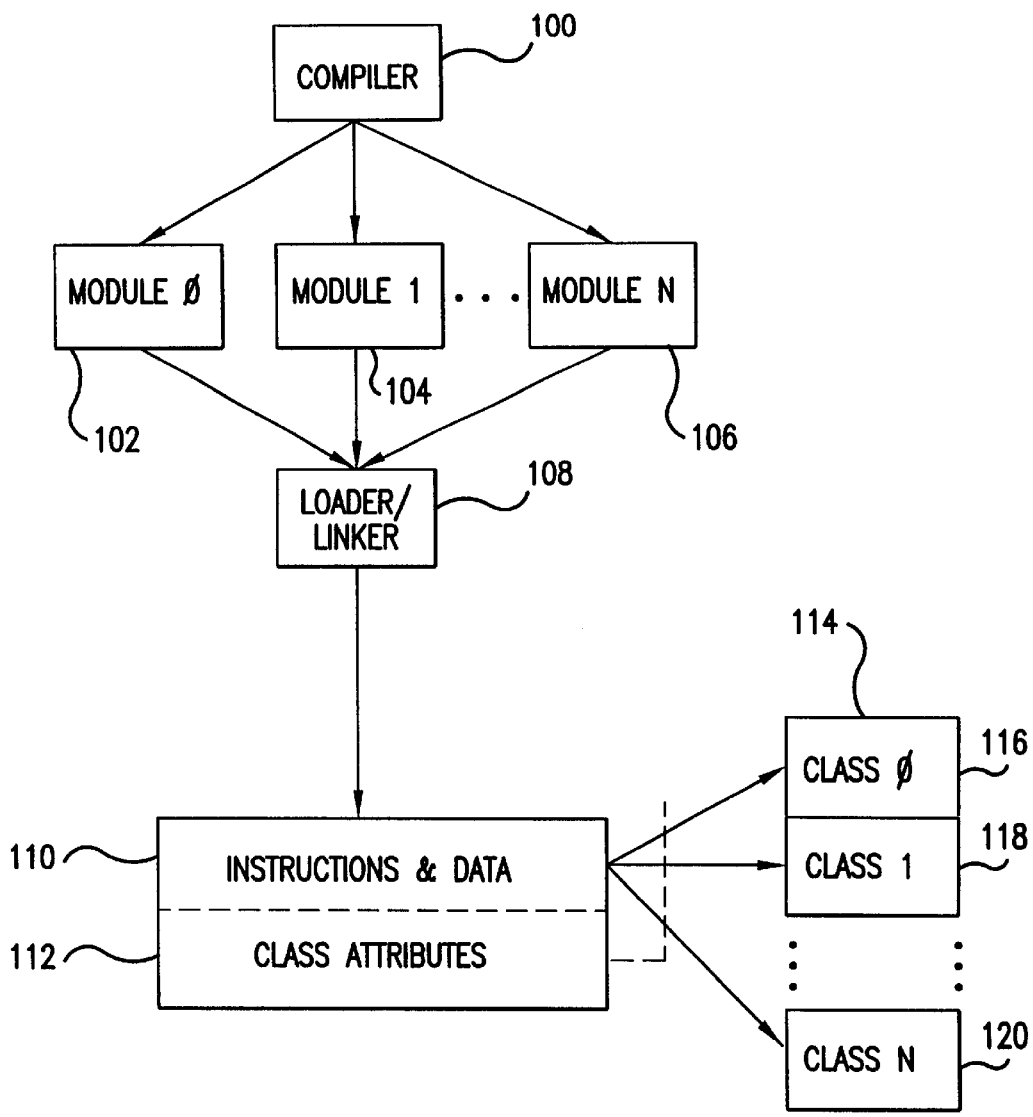
FIG. 1 is a block diagram illustrating both software and hardware in a computer system in accordance with the invention.

FIG. 1 illustrates an example computer system. A compiler 100 generates a set of code modules (102, 104, 106). A loader/linker 108 loads appropriate modules (and perhaps dynamically links various libraries) and generates run-time instructions and data 110 along with associated class attributes 112. A cache memory 114 is logically partitioned into separate sections corresponding to cache classes (116, 118, 120). Cache 114 may be a data cache, an instruction cache, a mixed cache, or a TLB. The cache 114 may be virtually indexed or physically indexed. Tags for cache 114 may be virtual or physical. When instructions and data 110 are placed in the cache 114 (as a function of dynamic execution of the program), they are placed into specific sections of cache 114, subject to a section placement algorithm as discussed further below. That is, instructions and data may be placed into a specific section for a cache class corresponding to the associated class attribute 112 or may be placed in one of multiple sections depending on the implementation of the section placement algorithm. The replacement algorithm for each class is dynamically selected based on the associated class attribute. That is, the replacement algorithm may vary from class to class. For example, within one class, the line least recently used may be replaced and within another class, lines may be replaced pseudo randomly. Class attributes may be encoded in a PTE, a segment table, or other virtual memory structure, or in the instruction stream.

Figure 2:
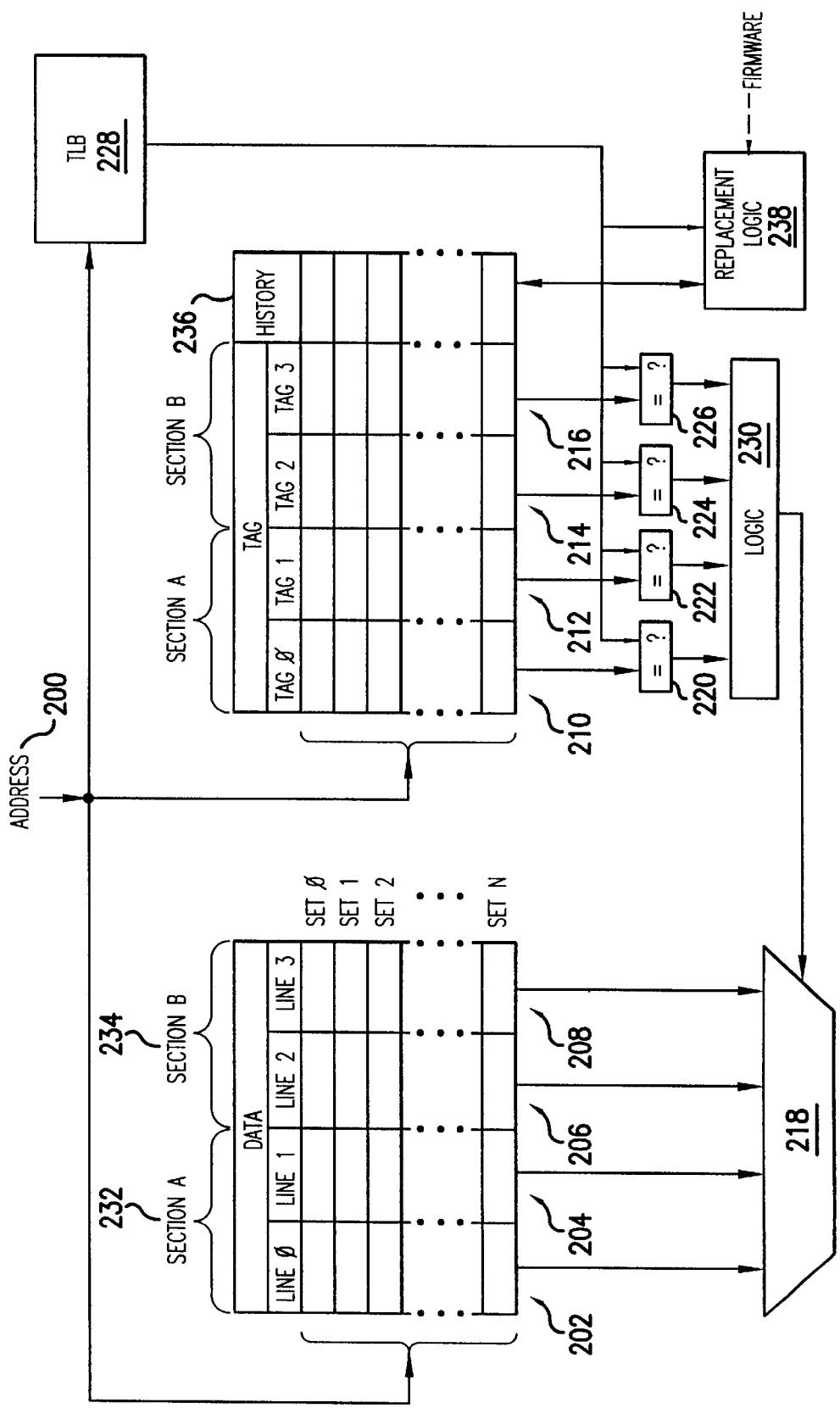
FIG. 2 is a block diagram of a partitioned four-way set-associative cache in accordance with the invention.

FIG. 2 illustrates additional hardware detail for an example of cache 114 in FIG. 1. FIG. 2 depicts part of a four-way set-associative cache. A virtual address 200 is presented by a processor to a memory system including the cache of FIG. 2. Within each of N sets, there are four lines of data (202, 204, 206, 208) and four corresponding address tags (210, 212, 214, 216). The tag portion of the cache in FIG. 2 has an additional column of data labeled history (236). This column may comprise counters, stacks, first-in-first-out buffers or other appropriate data structures for maintaining a history of which data lines in each set are most recently used, or most frequently used. The history 236 can be updated each time an item in the cache is referenced. One data set (four lines of data), at a cache location corresponding to low order set selection bits of the virtual address 200, is presented to a digital selector (multiplexer) 218. The four tags, at a cache location corresponding to low order set selection bits of the virtual address 200, are presented to digital comparators 220, 222, 224 and 226. The memory system also includes a TLB 228 for translating virtual addresses to physical addresses. A TLB is not necessary for the invention but it is used below to illustrate alternative embodiments of the invention. Tag entries from a set of address tags (210, 212, 214, 216) are compared to physical addresses by the digital comparators 220, 222, 224 and 226. If a tag entry matches the high order bits of the physical address, there is a cache hit, and additional logic 230 provides a signal used to select one of the four data lines presented to multiplexer 218. In the case of a cache miss, replacement logic 238 determines where a new item is placed, evicting an existing item if necessary.

In general, a request for data or code is a request for less than a line of data or code. Alternatively, in general, a line of data or code has more bits than the width of a hardware bus. An additional multiplexer (not illustrated) is used to select the required portion of a line, as determined by lower order address bits. Data or code being moved from a lower level of a memory hierarchy into a cache and data or code being moved from a cache into a lower level of the memory hierarchy may be temporarily stored in various buffers or auxiliary caches. Typically, when an item is requested, an address match is also performed on these buffers or auxiliary caches. If the requested item is in one of the buffers or auxiliary caches, it is provided to the processor with effectively the same timing as a cache hit. A separate multiplexer (not illustrated) selects whether data or code from a buffer or auxiliary cache or data or code from the main cache are presented to the processor.

In FIG. 2, each set of lines of data or code (202, 204, 206, 208), the associated set of tags (210, 212, 214, 216), and the history logic (236) are all further logically partitioned into sections (232, 234) corresponding to class attributes. These sections and classes are not relevant to retrieval of data from the cache or for determination of a cache hit. That is, data retrieval operations and determination of a cache hit may act according to prior art methods without regard for section boundaries and classes. Instead, sections and classes are used only by the replacement logic 238 to determine placement of new items into the cache. In the case of a miss, replacement logic 238, which may be under firmware control, combines data from the cache history 236 with a knowledge (input) of class attributes, and possibly other hardware states such as register contents, to determine within a set, within which section (232, 234) a new item is placed, and where within the section. If necessary, an existing item is evicted. When a new item is placed, the history logic 236 is also updated.

Partitioning of caches into sections (size and number) may be under software control. That is, replacement logic 238 may be programmable. Alternatively, replacement logic 238 may be switched among multiple fixed-program algorithms to accommodate the requirements of various software applications. For each item to placed into the cache, replacement logic 238 must determine the appropriate section or sections, and then a location (line) within a section. In the present patent document, the algorithm for deciding which section or sections is called the section placement algorithm. Section placement algorithms are discussed further in conjunction with FIG. 3. The algorithm for determining the appropriate location within a section is called a replacement algorithm. Each class may have a separate replacement algorithm. Again, replacement logic 238 implements section placement algorithms for deciding which section or sections and also implements replacement algorithms within each section.

Referring again to FIG. 1, class attributes 112 may be determined by a human software developer, by the compiler 100, by the loader/linker 108 (possibly under operator control), or at run-time (by operator control or by automatic observation of historical locality). Compiled object modules (102, 104, 106) typically include data structures needed by a linker (108), such as date of assembly, lengths of various parts of the object module, and symbol lists. A class attribute may be added to object module data structures for passing on to run time data structures. For example, see Kurpanek et al. In particular, regardless of when the class attributes 112 are generated, the class attributes 112 may be included in run time data structures used in virtual addressing. Virtual memory can be generally categorized into two types: fixed-size blocks, called pages, and variable sized blocks, called segments. In either type of virtual memory, there is an associated data structure that includes information for address translation. Class attributes 112 may be added to these associated data structures for address translation for use by any cache having class divisions. For simplicity, the following description refers to pages, but is equally applicable to segments.

There are at least three options for assigning class attributes 112 to pages, as follows. The following options are not mutually exclusive, and instead can be combined in any manner. In the following options, an example binary class attribute system is used, with class 0 designating items likely to be used in the future and class 1 designating items less-likely to be used in the future. Note that likelihood of future use includes temporal locality, where an item may be reused soon, and spatial locality, where a particular item may be placed into a cache even though the particular item has not yet been used.

In a first option, a programmer or operator designates, through explicit compiler/linker/loader commands, a class attribute 112. For example, consider a data base application where a data base must be searched sequentially. The data base has spatial locality so that a cache is useful, but there is little reuse of any one item. In a data stream of items having a mixture of spatial locality and temporal locality, the database accesses might repeatedly flush a cache. Therefore, it is useful for the programmer to designate the data base data structures as class 1, to prevent flushing of cached data with high temporal locality. Alternatively, the programmer may designate often called library functions as class 0. For example, an operating system dispatcher or interrupt handler may be expressly designated as highest-likelihood of future reuse.

In a second option, a compiler heuristically determines a class attribute. One example heuristic is to consider the total size of a data structure. Data structures that are larger than that which can be handled by an entire cache would be candidates for class 1, partly because they are less likely to be reused and partly because their heavy use might flush the entire cache. As a second example, a compiler can determine locality for some structures. Long sequences of instructions are examples of lines having high spatial locality, but little temporal locality. Another example is sequential data bases as discussed above. In each of these examples, the compiler can automatically identify these structures as having low temporal locality. Similarly, certain frequently called library functions can be automatically identified by a compiler as having high temporal locality.

In a third option, dynamic analysis of program run-time behavior is used to assign cache class attributes. For example, the cache may be periodically observed to detect entries that are frequent or infrequent, entry residency time, and replacement history information. The information may be gathered by the operating system or by other run-time software. The information may also be gathered by hardware instrumentation such as logic analyzers or emulators. The information may be passed back to a compiler for use in future compiles. Alternatively, the information may be presented to an operator. Alternatively, the run-time software may dynamically change the cache class of pages (page-table-entries) based on run-time behavior.

Each of the above options may be independent of whether items to be cached are code or data. Alternatively, code and data may be explicitly assigned different cache classes to provide separate code and data sections within a single cache, each of which may have a different replacement algorithm. Alternatively, the fact that an item is code or data may be combined with other factors to determine a cache class.

Note that classification may also be used in conjunction with hardware commonly used to improve cache performance. For example, caches may have an associated prefetch buffer to effectively increase the line or block size to decrease the average access time of sequential data or other data having high spatial locality. In addition, caches may have an associated fully associative auxiliary cache, in which miss lines are initially placed instead of displacing lines in the main cache, or in which evicted lines are placed instead of being returned to main memory, to decrease thrashing of data with conflicting addresses and high reuse. Accordingly, the section of the cache designated class 0 may have an auxiliary cache to decrease thrashing, dedicated to just the section designated class 0. Likewise, the section of the cache dedicated to class 1 may have a dedicated prefetch buffer or some other suitable dedicated auxiliary cache.

Figure 3A:
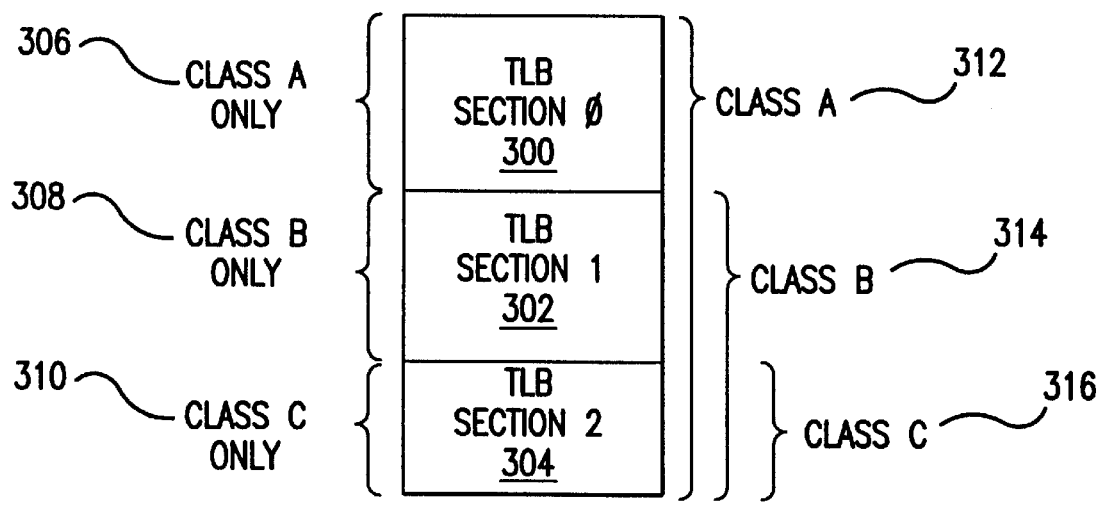
FIG. 3A is a block diagram of a partitioned TLB in accordance with the invention.
Figure 3B:
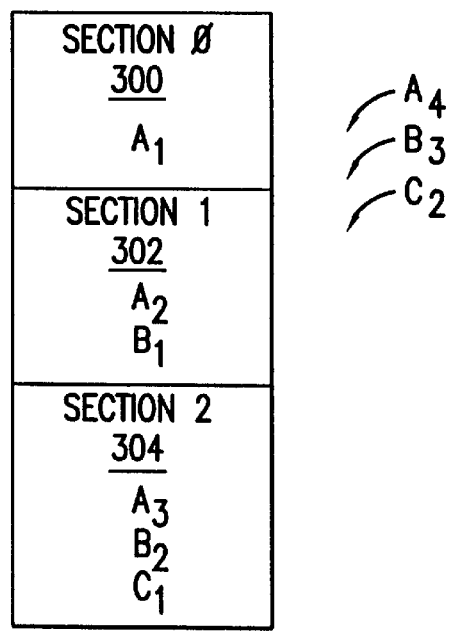
FIG. 3B is a block diagram of the TLB of FIG. 3A with items in the TLB for further illustration of section placement algorithms.

FIGS. 3A and 3B illustrate still another example embodiment of the invention, a TLB partitioned into classes. Recall that the TLB is also a cache. Therefore, the TLB may be partitioned into sections corresponding to classes. Note that either paged or segmented systems may include a TLB or its functional equivalent but in the specific example of FIGS. 3A and 3B paging is assumed. In FIGS. 3A and 3B, the TLB is a fully associative (one set) cache and the set is partitioned into three sections (300, 302, 304).

So far, in the discussion of FIGS. 1 and 2, it has been assumed that the section placement algorithm dedicates each section to a single attribute class. For example, in FIG. 3A, Section 0 (300) may be dedicated to Class A only (306), Section 1 (302) may be dedicated to Class B only (308) and Section 2 (304) may be dedicated to Class C only (310). As a result, part of the cache (for example, Section 2) is unavailable to items that may have a high degree of locality (for example, class A). As an alternative, the classes may be ranked in a hierarchy, with Class A having a higher rank in the hierarchy than Class B and so forth. In FIG. 3A, this is illustrated on the right-hand side where Class A items may be placed anywhere in the cache, Class B items may be placed in Section 1 (302) or into any section corresponding to a class having a lower rank in the hierarchy than Class B. Finally, Class C items may be placed only in Section 2 (304).

With a hierarchy of classes, there are at least two possible hierarchical section placement algorithms. In a first hierarchical section placement algorithm, a first item can displace a second item having an equal or lower hierarchical class rank, within any section where the first item is allowed. For example, a Class B item (314) can be placed in Section 1 (302) or Section 2 (304), and can displace a Class B item (314) within Section 1 (302), and can displace a Class B item (314) or a Class C item (316) within Section 2 (304), but cannot replace a Class A item (312) in either Section 1 (302) or Section 2 (304). In other words, for the first hierarchical section placement algorithm, class hierarchy dominates for eviction. This is further illustrated in FIG. 3B. In FIG. 3B, the TLB of FIG. 3A already contains some items as follows: Section 0 contains a first Class A item $A_1$, Section 1 contains a second Class A item $A_2$ and a first Class B item $B_1$, and Section 2 contains a third Class A item $A_3$, a second Class B item $B_2$, and a first Class C item $C_1$. In FIG. 3B, there are 3 potential new items to be placed into the TLB: $A_4$, $B_3$ and $C_2$. For the first hierarchical section placement algorithm, new item $A_4$ can displace any item in the TLB, new item $B_3$ can displace existing items $B_1$, $B_2$, or $C_1$, and new item $C_2$ can displace existing item $C_1$.

In a second hierarchical section placement algorithm, class hierarchy determines which sections are available for placement, but any item that can be placed into a particular section can displace any item in the particular section. For example, a Class A item (312) can be placed in Section 2 (304) but a Class C item (316) can displace a Class A item (312) within Section 2 (304). In FIG. 3B, for the second hierarchical section placement algorithm, new item $B_3$ can displace existing items $A_2$, $B_1$, $A_3$, $B_2$, or $C_1$, and new item $C_2$ can displace existing items $A_3$, $B_2$, or $C_1$.

For dedicated classes, the highest ranked class (FIG. 3A, 306) only has a relatively small cache (300) whereas for a class hierarchy, the highest ranked class (312) has the potential of occupying the entire cache. For dedicated classes and for class hierarchies using the second hierarchical section placement algorithm, the lowest ranked class (310) has a minimum guaranteed amount of cache storage. With the first hierarchical section placement algorithm, the advantage is that high priority workloads can use the entire TLB in appropriate situations, with the trade-off that a lower priority workload (for example, Class C items (316)) may be locked out. With the second hierarchical section placement algorithm, the same advantage is provided (high priority workloads can use the entire TLB), and some items (lines or pages) for the higher priority workloads are protected from eviction by lower priority workloads. However, for the second hierarchical section placement algorithm, once an item is placed in a low ranked section, it is treated the same as any other item in the low ranked section, and therefore a line or page for a lower priority workload may evict a line or page for a higher priority workload. These various advantages and disadvantages are summarized in Table 1 below.

TABLE 1

| | DEDICATED CLASSES | FIRST HIERARCHICAL SECTION PLACEMENT ALGORITHM | SECOND HIERARCHICAL SECTION PLACEMENT ALGORITHM |
| --- | --- | --- | --- |
| ADVANTAGES | High ranked items protected from eviction by lower ranked items. Low ranked items never locked out. Can implement locked sections. | Highest ranked items can occupy entire cache. High ranked items protected from eviction by lower ranked items. | Highest ranked items can occupy entire cache. Low ranked items never locked out |
| DISADVANTAGES | Part of cache unavailable to highest ranked items. | Low ranked items may be locked out. | High ranked items may be evicted by lower ranked items. |

For the first hierarchical section placement algorithm, in order to determine whether a new target item has a higher rank than a potential victim in the cache, the hierarchical rank (class attribute) of each item must be available at replacement time. That is, the class attribute must be retained and the class attribute has to be available to the replacement logic. In particular, for a cache of lines, for the first hierarchical section placement algorithm, storage must be provided for the class attribute of each individual line in the cache. For a TLB, or for a cache using a TLB, page related cache attributes may be retained as part of each page table entry within the TLB. However, in order to implement the first hierarchical section placement algorithm, the cache attributes stored in the TLB must be available to the replacement logic for the overall cache. Similarly, Intel PGE flags discussed earlier can not be used to protect individual lines within a line cache unless a provision is made for flag storage associated with individual lines in the cache and unless the flag storage is available to the replacement logic. In contrast, an advantage of dedicated classes and the second hierarchical section placement algorithm is that the class attribute is needed only to determine placement. Once an item is placed in the cache, only its location within the cache is significant for future replacement. In particular, in a cache of lines, the class attribute for each line does not need to be separately retained.

Attribute classes in accordance with the invention provide a straightforward implementation of partially locked caches. For example, at run-time, the operating system may set class attributes within page-table-entries for selected critical pages to a particular locked class attribute. The operating system may also ensure that no other pages have that particular locked class attribute. Then, with either a dedicated class system, or with a class hierarchy using the first hierarchical section placement algorithm, items having the particular locked class attribute are never replaced. With a dedicated class system, a locked class attribute may be implemented without requiring a class ID to be saved along with each cache line.

Note that in the Intel scheme, the total number of locked lines in the TLB must be limited to the total number of entries of the TLB or fewer. If the number of locked lines exceeds the total size of the TLB, a deadlock might occur. In the dedicated class locking method described above in accordance with the present invention, a locking replacement algorithm can use LRU replacement for a "locked" section to accommodate an over commitment of locked lines.

Attribute classes in accordance with the invention also provide a straightforward implementation of preventing caching of lines known to have low locality. That is, when such items can be identified, a class attribute can be used that prevents the replacement algorithm from ever placing the items in the cache.

Finally, consider a specific numerical example. Consider a TLB with a total of 96 entries. There are two classes. The 96 entries are partitioned in two sections for the purpose of replacement, with each section dedicated to a single class. In this example, in a first section, 80 TLB entries are reserved for class 0, and in a second section, 16 entries are reserved for class 1. Page-table-entries contain (in addition to the fields normally found in a page-table-entry) a one-bit cache class field that indicates which of the two cache classes is associated with the page. Class 0 designates pages that are expected to be likely to be used or reused. Class 1 designates pages that are expected to be less-likely to be used or reused. When a program runs, references with high temporal locality or references otherwise designated class 0 are allocated to the 80 entries of the first section. All other references must contend for the remaining 16 entries. When a reference misses the TLB, the section placement algorithm uses the cache class field in the fetched page-table entry to determine which replacement algorithm to use and thus which class section to victimize. Note that the class field does not have to saved in the TLB for dedicated classes or for a class hierarchy using the second hierarchical section placement algorithm.

The following are examples of cache replacement algorithms and section placement algorithms that might be used by replacement logic (FIG. 2, 238) with the specific numerical example.

EXAMPLE 1

(Two Different Replacement Algorithms, No Class Hierarchy)
input: class
   history
output: position
if class=1
   return random(80–95)
   else return LRU(history)(0–79)

EXAMPLE 2

(Class Hierarchy, Second Hierarchical Section Placement Algorithm)
input: class
   history
output: position
if class=1
   return random (80–95)
   else return random (0–95)

In example 1, if the class is 1, a random number between 80 and 95 is returned for a position. If the class is 0, the least recently used line number between 0 and 79 is returned. In example 2, if the class is 1, a random number between 80 and 95 is returned. If the class is 1, a random number between 0 and 95 is returned. For either example, lines having class 1 are placed only in the last 16 spaces in the cache. In example 1, lines having class 0 are restricted to the first 80 spaces. In example 2, lines having class 0 may victimize any line in the cache. However, in example 2, a new line having class 1 might replace a line having class 0 located in the last 16 spaces.

Figure 4:
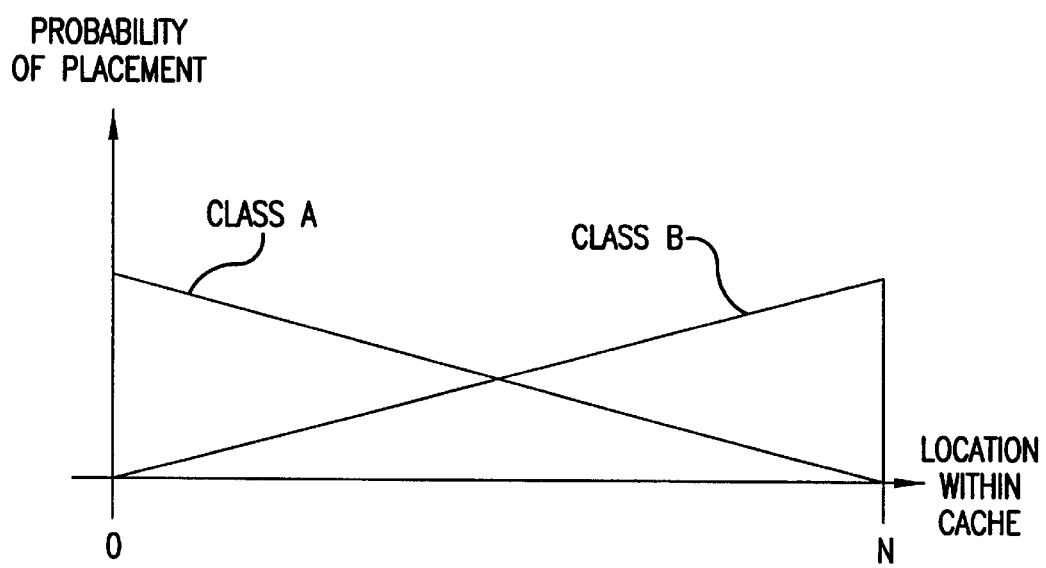
FIG. 4 is a graph of 2 probability density functions, illustrating probability of replacement as a function of location for a cache having two separate replacement algorithms for a single logical cache section.

In each of the above embodiments, the cache is partitioned into distinct logical sections with a distinct boundary between sections. However, distinct partitioning is not necessary. Instead, with multiple replacement algorithms, different classes can be spatially distributed differently within one or more sections, changing the probability of victimization without distinct section boundaries. FIG. 4 illustrates one example. In FIG. 4, the horizontal axis represents locations in a cache numbered from 0–N. The vertical axis represents the probability that a replacement algorithm will place an item of a particular class in a particular location. For items having Class A attributes, the probability of being placed in the locations near location 0 is higher than the probability of being placed in the locations near location N. For items having Class B attributes, the probability of being placed in the locations near location N is higher than the probability of being placed in the locations near location 0. Therefore, each class has access to the entire cache, but on a statistical basis, victimization of one class by the other class is reduced because the spatial distributions are not uniform.

Note that dedicated sections, hierarchical sections, uniform distributions, and non-uniform distributions can all be combined. For example, each of the following is possible:

(a) dedicated sections with uniform distributions;

(b) dedicated sections with non-uniform distributions;

(c) hierarchical sections with uniform distributions;

(d) hierarchical sections with non-uniform distributions.

In summary, the various embodiments of the invention provide caches with dynamic selection of replacement based on class attributes. In some embodiments, caches are partitioned into sections based on class attributes. In some embodiments, there is a class hierarchy with a section placement algorithm. In general:

(a) any associative (at least two-way set associative) cache can have at least two different replacement algorithms;

(b) any associative cache having at least two lines can be partitioned into sections (not restricted to TLB's);

(c) there may be more than two classes and more than two sections;

(d) there may not be a one-to-one correspondence between classes and sections;

(e) classification may be based on something other than temporal locality;

(f) each class may have a separate replacement algorithm; and (g) an item having one class may be placed into sections corresponding to other classes.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A computer system comprising:

a cache memory;

wherein an item to be entered into the cache memory has an associated class attribute, the associated class attribute having at least two possible values comprising a first value and a second value; and the cache memory is adapted to use a first replacement algorithm for placing a first item into the cache memory when the first item has an associated class attribute having the first value, and the cache memory is adapted to use a second replacement algorithm for placing a second item into the cache memory when the second item has an associated class attribute having the second value.

2. The computer system of claim 1 wherein:

the cache memory is partitioned into at least a first section and a second section; and the cache memory is adapted to place the first item into the first section and adapted to place the second item into the second section.

3. The computer system of claim 2 wherein the cache memory is adapted to optionally place the first item into the second section.

4. The computer system of claim 3, further comprising:

the class attribute associated with a particular item indicating a likelihood of future use of the particular item, wherein the particular item is placed in the first section when the class attribute for the particular item indicates that the particular item has a high likelihood of future use and the particular item is placed in the second section when the class attribute for the particular item indicates that the particular item has a low likelihood of future use.

5. The computer system of claim 4 wherein the class attribute for the particular item is determined by a compiler.

6. The computer system of claim 4 wherein the class attribute for the particular item is determined by a human operator.

7. The computer system of claim 4 wherein the class attribute for the particular item is determined by run-time software.

8. The computer system of claim 7 wherein the run-time software is an operating system.

9. The computer system of claim 2 wherein the first section is associated with items having a high temporal locality.

10. The computer system of claim 2 wherein the second section is associated with items having a high spatial locality.

11. The computer system of claim 2, further comprising an auxiliary cache that is associated with one section but not associated with the other section.

12. The computer system of claim 2, further comprising a prefetch buffer that is associated with one section but not associated with the other section.

* * * * *